Sept. 4, 1928.
C. HAMMER
COMBINED CAP OR CLOSURE AND LINER PLATE
Filed July 27, 1925
1,683,387
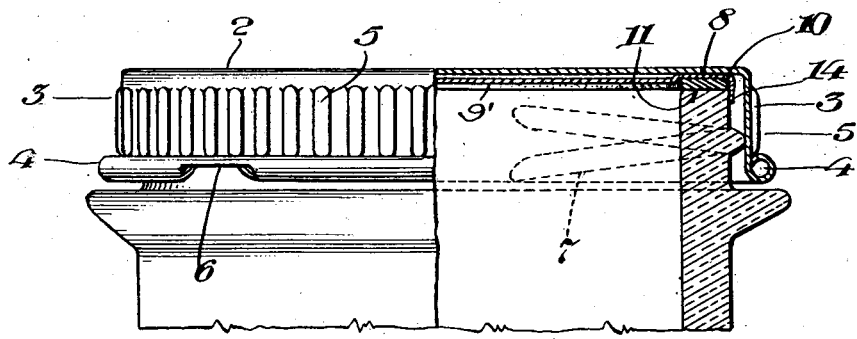
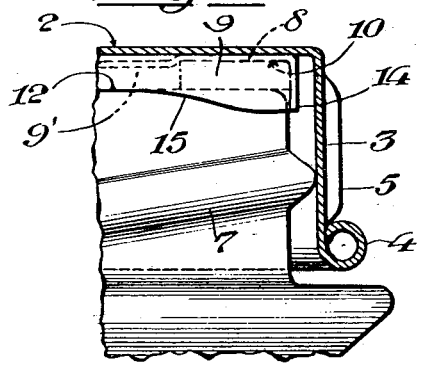 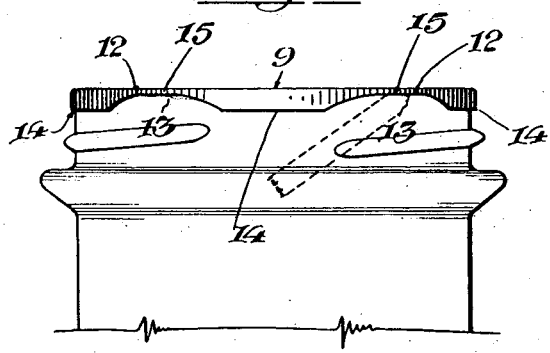
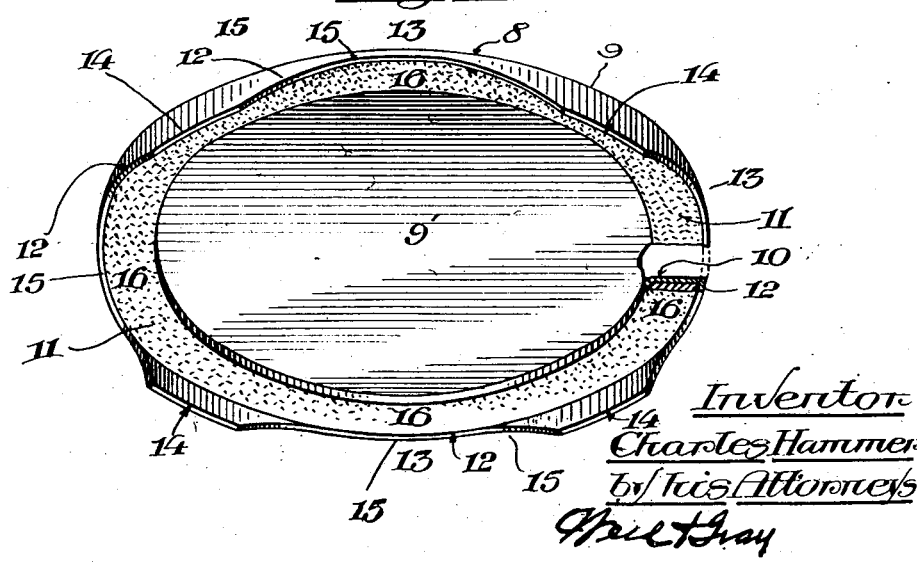
Inventor
Charles Hammer
by his Attorneys Patented Sept. 4, 1928.

1,683,387

UNITED STATES PATENT OFFICE.

CHARLES HAMMER, OF HOLLIS COURT BOULEVARD, NEW YORK, ASSIGNOR TO AMERICAN METAL CAP COMPANY, OF BROOKLYN, NEW YORK, A CORPORATION OF NEW YORK.

COMBINED CAP OR CLOSURE AND LINER PLATE.

Application filed July 27, 1925. Serial No. 46,221.

This invention relates to a combined cap or closure and sealing member or liner plate for containers, such as glass containers, the primary object of the invention being to provide a combined cap or closure and improved reusable liner therefor, which will effectively permit the release of the liner plate from the container when the same is vacuum-sealed without the mutilation or injury of the liner plate or its gasket, so that the same can be effectively reused and which is also so constructed as to properly center itself relatively to the cap.

A further object of the invention is the provision of an improved metal sealing member or liner plate, applicable for use with different forms of caps but particularly for rotatable caps, in which the plate has a ring gasket for contact with the edge or mouth of the container, and so constructed that it can be almost instantaneously released from the container without injury or destruction of the gasket.

Where rubber ring gaskets or composition liners are used in the vacuum sealing of containers, such as glass containers, it is extremely difficult after the removal of a cap or closure to release the sealing member or gasket without the injury or destruction of such sealing member or its gasket, and therefore the primary object of the present improvement is to provide an improved sealing member or liner so constructed that a knife blade or other pointed instrument may be quickly inserted directly between the rubber gasket and the container mouth to permit the passage of air, and thus permit the ready and quick removal of the sealing member without injury to the gasket thereof, and when the sealing member or liner plate is made of metal the cap may be readily rotated into place or released without interfering with the position of the liner plate and its gasket relative to the sealing surface of the container and consequently the liner plate may be readily reused by the purchaser.

In the drawings accompanying and forming a part of this specification, Fig. 1 illustrates one form of rotary cap partly in section which may be used together with this improved liner or sealing member applied to a glass container; Fig. 2 is an enlarged detail view of the cap and sealing member shown in Fig. 1; Fig. 3 is a perspective view of this improved liner plate or sealing member; and Fig. 4 illustrates the liner plate in position on a glass container after the removal of the cap, the dotted lines illustrating the manner in which an instrument may be readily inserted directly between the gasket and the container mouth to release the gasket.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The cap or closure in the form shown is what is now commonly known in the trade as an Amerseal cap, it comprising a top 2 having a depending flange 3 provided with a curled or strengthened or beaded lower edge 4 commonly termed a wire edge, and with suitable knurls or corrugations, 5, the curled edge being provided with lugs or projections 6 adapted to engage suitable projections or threads 7 of a glass container when the cap is rotated on to the container. Located within this rotary cap is this improved sealing member or liner plate 8, which comprises a disk or plate 9 wholly enclosed by the cap when the form of cap shown is used, and this plate is provided with an annular recess 10 for the reception of a flat ring gasket 11. This annular recess is formed by a depressed panel 9' and the flange hereinafter referred to. The plate is provided with a depending flange 12 shown as of shallow formation, which flange is provided adjacent to the under face of the flat ring gasket with means which will permit the insertion of an instrument for releasing the gasket from the container. This means comprises a plurality of recesses or recessed portions. In the form shown, the lower edge of the flange is of undulating or scalloped formation as at 13, so that a part or parts 14 thereof project somewhat below the lower face or wall of the ring gasket while other part or parts 15 thereof terminate adjacent to such lower or under face 16 of the ring gasket 11, thus forming recesses in the depending flange, the upper edges of which recesses are in substantial alignment with the lower wall of the depressed panel 9' and serve to guide the vacuum releasing instrument and protect the gasket from injury since the depending flange completely encloses and conceals the gasket all around its outer edge while the panel protects its inner edge thereby protecting the gasket not only from air and moisture which, as is well-known has a deteriorating effect upon rubber, but also from injury by the releasing instrument.

While the flange of this plate could be formed in various ways to permit the insertion of a suitable instrument at the under side of the flat ring gasket, I have found that desirable results are obtained by scalloping the flange of the sealing member or disk, since this accomplishes two purposes: First, it permits parts of the disk flange to terminate directly at the under side or sealing face of the rubber gasket, so as to permit the quick and ready insertion of an instrument to release the gasket and thereby the liner plate from the container, and secondly, it permits parts of the flange of the liner plate to project below the gasket and thus act as guides to center the cap during its application to the container.

Thus in the preferred form shown, the metal liner plate has its depending flange of just sufficient depth at intervals to overlap the edge of the gasket while at other intervals it projects somewhat below the gasket, these latter portions acting as guides to center the liner plate in the cap and on the container. The depth of the scallop however, will depend somewhat upon the depth of the flange.

The disk, as stated, is provided with an annular recess 10 for the reception of the flat ring gasket, and by reason of this recess it will be observed that the flange of the liner plate can be made very shallow and parts thereof of just sufficient depth to overlap the edge of the flat ring gasket, and while other parts project somewhat below the rubber gasket, nevertheless these parts can also, by reason of the construction shown, be of shallow depth. This shallow flange also conserves the amount of metal required in the formation of this improved sealing member or liner, while it permits the effective use of an instrument directly at the under side of the gasket where it has its sealing contact with the container mouth edge, and also permits the formation of parts of the flange for the purpose of centering the liner plate in the cap, thereby insuring the proper sealing of the liner plate upon the container.

In the form of liner plate shown, I have provided it with four portions 15 where the releasing instrumentality can be readily inserted, and consequently with four projecting portions 14 acting to properly center the liner plate within the cap, which in the present instance correspond with the number of locking lugs shown on the cap. A larger or a smaller number of course of these various parts could be used if preferred, especially in small size caps where a less number would probably be sufficient.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A metal liner plate or sealing disk for use with a cap, said sealing disk having a gasket therein and a shallow depending flange extending below the gasket and provided with a plurality of recesses for the insertion of a vacuum releasing instrumentality, said recesses having their upper edges located at the under side of the gasket whereby the gasket is completely covered and protected all around its outer edge by the depending flange.

2. A metal liner plate or sealing disk for use with a cap, said sealing disk having a gasket and a shallow depending flange completely covering and protecting the gasket all around its outer edge, said flange having a series of spaced depending portions extending below the gasket for centering the cap, the lower edges of the shallow flange intermediate such depending portions terminating at the underside of the gasket.

3. A metal liner plate or sealing disk for use with a cap, said sealing disk having a gasket and a depending flange terminating at a plurality of spaced intervals at the underside of the gasket and terminating at alternate spaced intervals below the underside of the gasket, whereby the gasket is completely covered and protected all around its edge.

4. A metal liner plate or sealing disk for use with a cap, said sealing disk having an annular recess for the reception of a gasket and a depending flange terminating at a plurality of spaced intervals at the underside of the gasket for the insertion of a vacuum releasing instrument at different points around the flange and terminating at alternate spaced intervals below the underside of the gasket, whereby the gasket is completely covered and protected all around its edge.

5. A metal liner plate or sealing disk for use with a cap, said sealing disk having an annular recess for the reception of a flat ring gasket and a depending shallow flange of scalloped or undulating form overlapping the outer edge of the gasket all around such gasket thereby to enclose and protect such outer edge, alternate portions of said depending flange extending below the gasket and effective to center the cap, and alternate portions terminating at the under side of the gasket forming recesses for the insertion of a vacuum releasing instrumentality at different points around the flange.

Signed at 1822 Park Row Building, New York city, N. Y., this 23rd day of July, 1925.

CHARLES HAMMER.